(12) United States Patent
Virtanen et al.

(10) Patent No.: US 7,513,488 B2
(45) Date of Patent: Apr. 7, 2009

(54) FOAMING METHOD AND DEVICE

(75) Inventors: Matti Virtanen, Kyro (FI); Raili Kaarina Virtanen, legal representative, Kyro (FI); Jouni Rainio, Puhos (FI)

(73) Assignee: Raute Oyj, Nastola (FI)

( * ) Notice: Subject to any disclaimer, the term of this patent is extended or adjusted under 35 U.S.C. 154(b) by 494 days.

(21) Appl. No.: 11/324,614

(22) Filed: Jan. 3, 2006

(65) Prior Publication Data

US 2006/0113044 A1  Jun. 1, 2006

Related U.S. Application Data

(62) Division of application No. 10/749,463, filed on Dec. 31, 2003, now Pat. No. 7,132,023.

(30) Foreign Application Priority Data

Dec. 31, 2002  (FI) ............................. IF-20022291

(51) Int. Cl.
*B01F 3/04* (2006.01)
(52) U.S. Cl. .................... 261/76; 261/89; 261/DIG. 26
(58) Field of Classification Search .................. 261/28, 261/76, 84, 89, 116, DIG. 26
See application file for complete search history.

(56) References Cited

U.S. PATENT DOCUMENTS

| | | | |
|---|---|---|---|
| 3,749,378 A | * | 7/1973 | Rhodes ...................... 261/78.2 |
| 3,941,355 A | * | 3/1976 | Simpson ....................... 366/99 |
| 3,965,860 A | | 6/1976 | Cone et al. |
| 4,059,714 A | | 11/1977 | Scholl et al. |
| 4,084,795 A | * | 4/1978 | Vaughn .................... 366/181.5 |
| 4,396,529 A | | 8/1983 | Price et al. |
| 4,400,220 A | * | 8/1983 | Cole, Jr. ....................... 134/18 |
| 4,630,774 A | * | 12/1986 | Rehman et al. ................. 239/8 |
| 4,632,314 A | * | 12/1986 | Smith et al. ................. 239/433 |
| 5,356,565 A | * | 10/1994 | Southwell ..................... 516/10 |
| 5,427,181 A | * | 6/1995 | Laskaris et al. ............... 169/14 |
| 5,480,597 A | * | 1/1996 | Ishida et al. ................ 264/40.4 |
| 5,492,655 A | | 2/1996 | Morton et al. |
| 6,010,083 A | * | 1/2000 | Roe et al. ................. 239/427.5 |
| 6,217,009 B1 | * | 4/2001 | Rowe ........................ 261/78.2 |
| 6,550,750 B1 | * | 4/2003 | Kalkstein et al. .............. 261/76 |
| 6,623,154 B1 | * | 9/2003 | Garcia ..................... 366/163.2 |

FOREIGN PATENT DOCUMENTS

SU  1139448  2/1985

* cited by examiner

*Primary Examiner*—Scott Bushey
(74) *Attorney, Agent, or Firm*—Merchant & Gould P.C.

(57) ABSTRACT

The invention relates to a method and a device for foaming glue for the production of wood-based sheets. Gluing substance and gas are fed (1,2) into the foaming device through nozzles (3,4), which are directed to mix the gluing substance and gas to be fed to form an essentially homogenous mixture prior to foaming. After this the gluing substance is foamed mechanically in the foaming chamber (5) with the aid of gas.

5 Claims, 2 Drawing Sheets

FOAMING METHOD AND DEVICE

REFERENCE TO CO-PENDING APPLICATIONS

Figure 1:
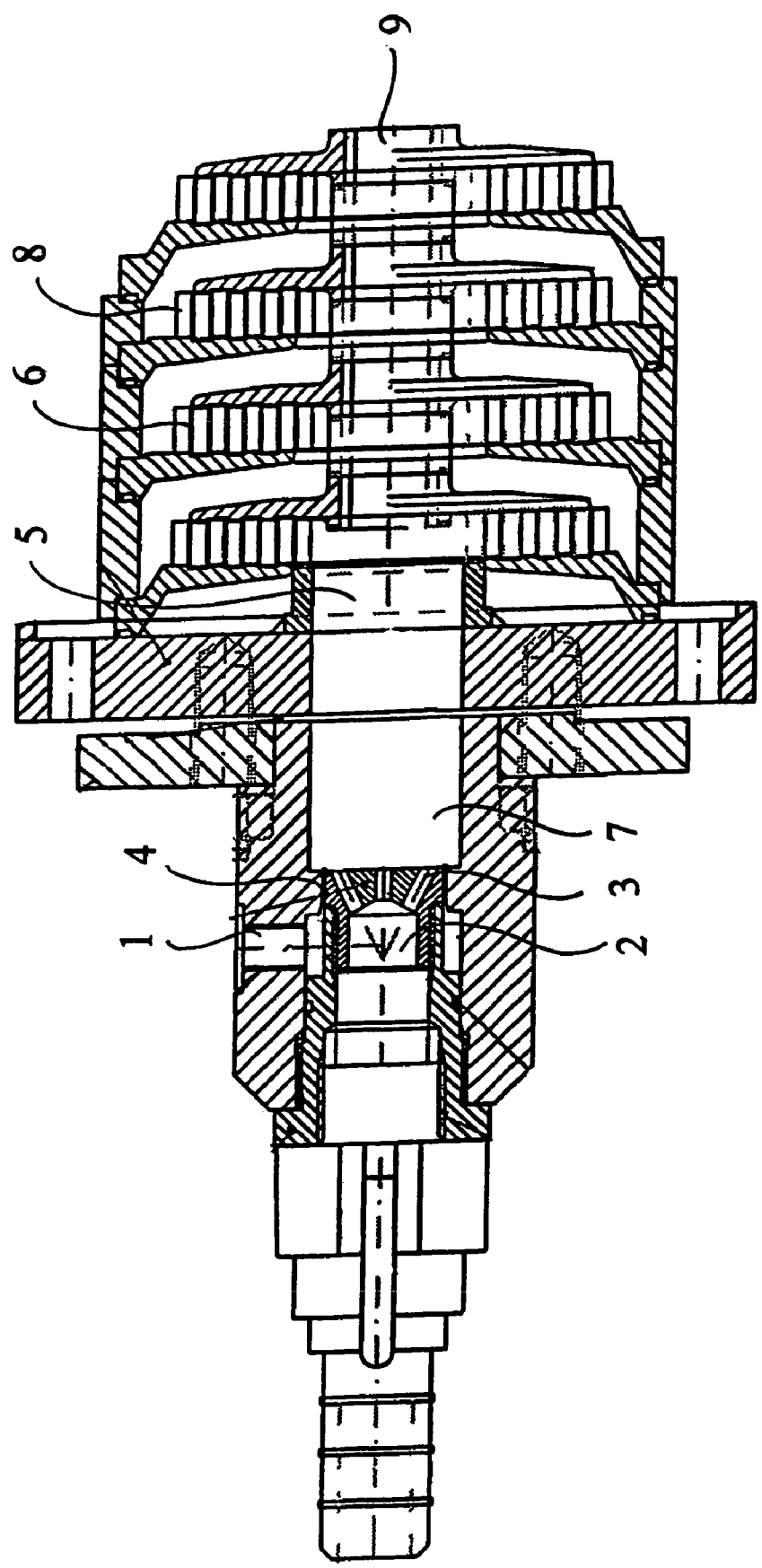

This application is a divisional application of and claims priority to U.S. patent application Ser. No. 10/749,463, entitled "Foaming Method and Device" and filed on Dec. 31, 2003, now U.S. Pat. No. 7,132,023 that issued on Nov. 7, 2006, the disclosure of which is hereby incorporated by reference in its entirety.

The invention relates to a foaming method and a foaming device used in the production of wood-based sheets such as plywood, battenboard or the like to achieve the necessary foaming of the glue.

Plywood as used herein refers to plywood, battenboard or a similar many-layered product that is formed of at least three veneer layers placed one on top of the other or crossways to one another and glued and compressed against one another.

Previously known are different foaming methods and devices used in the wood sheet industry to foam glue with the aid of gas, advantageously of air, before it is fed for gluing wood sheets. In known foaming methods and devices glue and air are directed straight into a foaming chamber where the glue is foamed mechanically with the aid of air.

The problem of known foaming methods is that the foaming of the glue is not efficient enough. To achieve the desired degree of foaming it is necessary to use very high mechanical foamer rotation speeds, which in turn results in the added disadvantage of heating of the glue mixture.

The object of the invention is to remove the above-mentioned disadvantages. In particular the object of the invention is to disclose a new, better and more efficient glue foaming method and device.

A foaming method and device according to the invention is characterised by that which is presented in the claims.

The base of the invention is a method for foaming glue for production of wood-based sheets in which the gluing substance and the gas are brought into contact with one another and the gluing substance is mechanically foamed with the aid of the gas. According to the invention the gluing substance and the gas are mixed to an essentially homogeneous mixture before mechanical foaming.

In mechanical foaming the gluing substance and gas mixture is beat vigorously by mechanical foaming means, whereupon the gluing substance is made to foam with the aid of gas bubbles.

In one embodiment of the invention the gas and the gluing substance are mixed by spraying them together simultaneously as several directed partial flows such that as large a contact surface area as possible is produced between the gas and the gluing substance.

In one embodiment of the invention the gluing substance and the gas are sprayed in a circular way such that the gas is fed essentially from the centre and the gluing substance from a ring around the gluing substance feed with the gluing substance and gas sprays directed such that the gluing substance and the gas come in contact with one another.

In one alternative embodiment of the invention the gluing substance and the gas are sprayed in an circular way such that the gas is fed essentially from the centre and the gluing substance from a ring around the gas feed with the gluing substance and gas sprays directed such that the gluing substance and the gas come in contact with one another.

In one embodiment the gluing substance and gas flows are sprayed simultaneously from a feeder surface on which the gluing substance and gas feeder nozzles are arranged alternately and essentially symmetrically across the entire surface area.

In one embodiment of the invention air is used as the gas.

In one embodiment of the invention a composition is used as the gluing substance that contains resin, foaming agent, filling agent and/or hardener. In one embodiment for the resin, which is the actual gluing substance, advantageously phenol formaldehyde resins, urea formaldehyde resins, amino resins or other similar resins can be used. For the foaming agent, filling agent and hardener different types of substances known in the art and suitable for their intended purpose can be used.

Additionally the base of the invention is a device for foaming glue for the production of wood-based sheets in which the device has gluing substance and gas nozzle system, and a foaming chamber and foaming means for foaming the gluing substance mechanically with the aid of a gas, and means for directing the foamed gas out of the device. According to the invention the device has a mixing chamber, in which are arranged gluing substance and gas nozzles of the nozzle system that are directed to mix the gas and gluing substance fed into the mixing chamber into an essentially homogeneous mixture before mechanical foaming.

In one embodiment of the invention the nozzle system is arranged to mix by spraying partial flows of gluing substance and gas simultaneously from many directed gluing substance and gas nozzles such that the largest possible contact surface area between the gluing substance and the gas is produced.

In one embodiment of the invention the nozzles of the nozzle system are arranged such that the gluing substance nozzles are arranged essentially in the centre and the gas nozzles are arranged in a ring-shaped form around the gluing substance nozzles, and the gas and gluing substance nozzles are directed such that the sprayed gluing substance and gas are brought in contact with one another.

In one embodiment of the invention the nozzles of the nozzle system are arranged such that the gas nozzles are arranged essentially in the centre and the gluing substance nozzles are arranged in a ring-shaped form around the gas nozzles, and the gas and gluing substance nozzles are directed such that the sprayed gluing substance and gas are brought in contact with one another.

In one embodiment of the invention the nozzles of the nozzle system are arranged in a matrix construction where gas and gluing substance nozzles alternate across the entire feeder surface area of the nozzle system. The gas and gluing substance nozzles are essentially evenly distributed across the entire surface of the nozzle structure.

In a device according to the invention the number of nozzles can vary depending on for example intended use and the conditions for use.

Advantageously the gluing substance and gas nozzles of the nozzle system can in principle be directed in any way whatsoever, however such that between the sprays of gluing substance and gas the largest possible contact surface area is produced. Due to a large contact surface area and the mixing of substances that occurs there, as perfect-as-possible mixing of the gluing substance and gas into an even, homogeneous mixture occurs. The nozzles can be directed straight down or straight to the side at a 90-degree angle or at any angle between 0° and 90°.

In one embodiment of the invention the foaming means include rotor plates whose rotation speed is advantageously about 500-1200 rpm.

In one embodiment the foaming device contains a water circulation system, by which the functioning of the foamer can be maintained for example during production standstill without unnecessary foaming of the gluing substance and extinguishing of the foam.

Due to the invention a more efficient glue foaming process can be achieved. Due to the forming of a homogeneous gluing substance-gas mixture, the gluing substance foams better with lower rotation speeds and warms up less during the foaming.

Due to the invention an even, homogeneous gluing substance and gas mixture can be achieved already before the actual mechanical foaming, whereupon also the foamed glue mixture that is directed onto the surface to be glued is highly homogenous. Additionally the foamed glue mixture is easy and quick to spread on a surface to be glued.

A foaming method and device according to the invention are suitable for use in the production of different types of wood-based sheets under various conditions.

Figure 2:
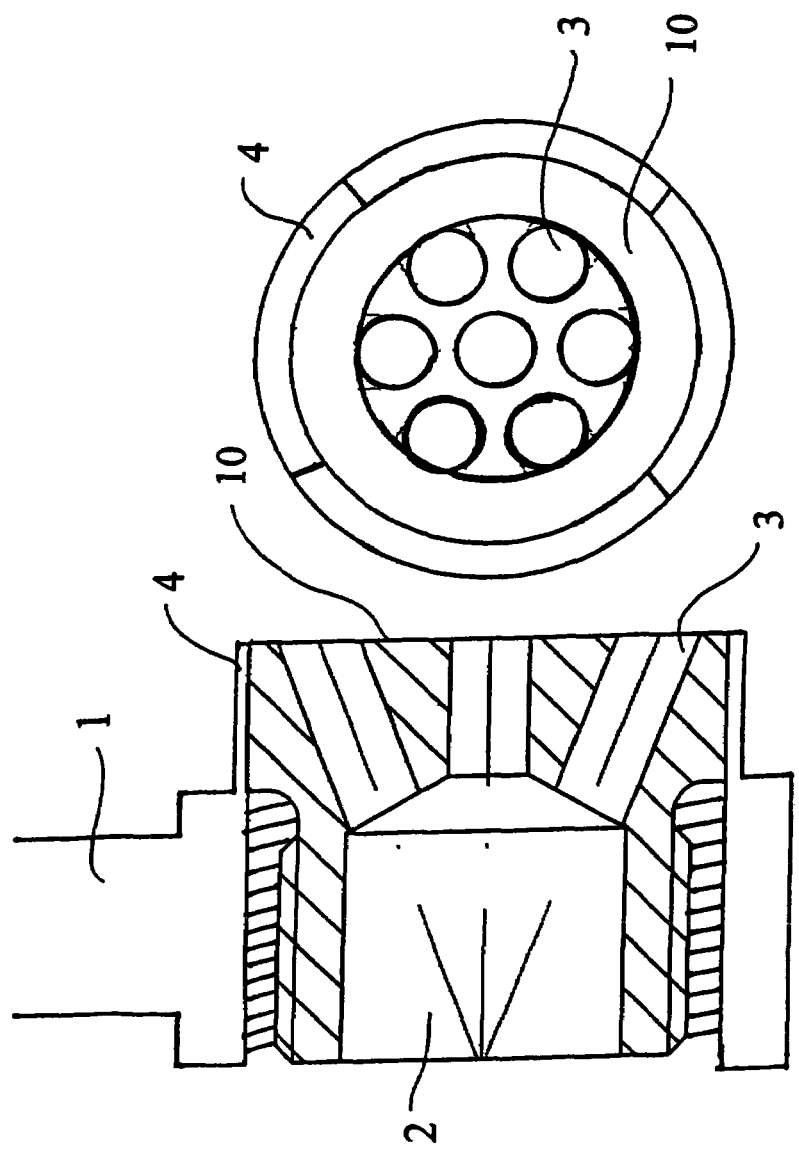

In the following, the invention is described in detail with the aid of application examples with reference to the accompanying drawings, in which FIG. 1 shows a foaming device according to the invention, and FIG. 2 shows in more detail the nozzle system of the device of FIG. 1.

FIG. 1 shows a foaming device that is intended for foaming a gluing substance mixture with the aid of air. The foamed gluing substance is used for gluing wood-based thin sheets and joining them to one another to form for example, plywood.

The foaming device in FIG. 1 has a nozzle system 1-4, through which the gluing substance and air are fed into the foaming device and a mixing chamber 7, into which the gluing substance are fed and in which occurs the spraying of gluing substance and air to form an adequately homogeneous mixture prior to the actual foaming. The foaming device also contains a foaming chamber 5 and four rotor plates 6 that function as foaming means for foaming the gluing substance mechanically with the aid of air. The centrifugal rotor plates 6 are arranged inside the foaming chamber 5, in which the gluing substance is foamed. The rotation speed of the rotor plates is set to 500-1200 rpm. The rotor plates have projections 8 that are arranged symmetrically in five circularly winding rows. These projections 8 aid in the foaming of the gluing substance. For mechanical foaming any kind of mixing organs suitable for foaming can be used, these are not shown in this connection in more detail. Additionally the foaming device contains a pipe or canal 9 for directing the gluing substance out of the device and for spreading the glue.

The nozzle system 1-4 of FIGS. 1 and 2 contains feeder means for both the gluing substance 2 and air 1 as well as seven nozzles 3 for the gluing substance and arranged in the shape of a circle in a ring-like way nozzles 4 for air for feeding the gluing substance and air by spraying them into the mixing chamber 7. Nozzles 3,4 are arranged in the feeder surface area 10 of the nozzle system, such that the gluing substance nozzles 3 are located symmetrically in the middle of the feeder surface area and the air nozzles 4 are arranged in a circular way in one ring around the gluing substance nozzles 3. Both the gluing substance and the air nozzles 3,4 are directed such that a large and good contact area is produced between the partial flows of gluing substance and air and such that the partial flows mix to form an essentially homogenous mixture in the mixing chamber 7 before the actual foaming chamber 5, when the gluing substance and air partial flows are sprayed simultaneously from nozzles 3 and 4 into the mixing chamber 7. Gluing substance 3 and air nozzles 4 are arranged into the mixing chamber 7.

Further the device in FIG. 1 contains means for raising and adjusting the pressure of air, preferably to approximately 4 bar, prior to feeding it into the foaming device. Additionally the device contains a means for adjusting airflow. Means for adjusting pressure and flow are not shown in the figure.

Further the device in FIG. 1 contains a gluing substance pump for pumping the gluing substance from the glue storage container into the nozzle system and a flow adjustment meter for adjusting the desired speed of flow. The pump and the flow adjustment meter are not shown in the figure.

Additionally the device in FIG. 1 contains a temperature measuring probe and a temperature adjustment means, which are not shown in the figure, and are used to adjust the temperature of the gluing substance-air mixture.

In a method application according to the invention air, at a pressure of about 4 bar, is directed and gluing substance is pumped at a desired speed of flow into the foaming device shown in FIG. 1 through the nozzle system such that the partial flows of gluing substance are sprayed from the nozzles in the centre and air is sprayed in a ring-like way around the sprays of gluing substance into the mixing chamber. The gluing substance and air nozzles are directed in the mixing chamber such that a large contact surface area is produced between the gluing substance and the air, in which case their homogeneous mixing occurs prior to their being directed into the actual foaming area. In the actual foaming area the homogenous gluing substance-air mixture is foamed mechanically with the aid of beating means or in other words rotor plates. The foamed gluing substance is directed to the glue-spreading device for spreading for the gluing of wood-based sheets and for joining these sheets together. Alternatively the gluing substance can, for example during a production standstill or during a temporary disturbance, be directed into so-called foam extinguishing and be later recycled for foaming of the gluing substance.

A foaming method and device according to the invention are suitable for various embodiments to achieve the necessary foaming of the glue when producing different types of wood-based sheets.

Applications of the invention are not limited to the examples described rather they may vary in the scope of the accompanying claims.

The invention claimed is:

1. A device for foaming glue for the production of wood-based sheets, wherein the device contains a gluing substance and gas nozzle system for the feeding of the gluing substance and a gas, and a foaming chamber and foaming means for foaming the gluing substance mechanically with the gas, wherein the foaming means include rotor plates, and means for removing the foamed gluing substance from the device, wherein the device contains a mixing chamber, in which are arranged the gluing substance and gas nozzles of the nozzle system, that are directed into the mixing chamber to mix the gas and gluing substance to be fed into an essentially homogenous mixture prior to foaming.

2. A device according to claim 1, wherein the nozzle system is arranged to mix by spraying partial flows of gluing substance and gas from many directed gluing substance and gas nozzles in that mixing chamber such that the largest possible contact surface area between the gluing substance and the gas is produced.

3. A device according to claim 1, wherein the nozzles are arranged such that the gluing substance nozzles are arranged essentially in the center and the gas nozzles around the gluing substance nozzles in a circular shape.

4. A device according to claim 1, wherein the nozzles are arranged such that the gas nozzles are arranged essentially in the center and the gluing substance nozzles around the gas nozzles in a circular shape.

5. A device according to claim 1, wherein the nozzles are arranged in a matrix construction, in which the gas and gluing substance alternate across the entire feeder surface area.

\* \* \* \* \*